United States Patent
Gartner et al.

(10) Patent No.: US 11,934,379 B2
(45) Date of Patent: Mar. 19, 2024

(54) METHOD AND SYSTEM FOR ADDRESS VERIFICATION

(71) Applicant: Lob.com, Inc., San Francisco, CA (US)

(72) Inventors: Marcus Gartner, San Francisco, CA (US); David Currie, San Francisco, CA (US)

(73) Assignee: Lob.com, Inc., San Francisco, CA (US)

( * ) Notice: Subject to any disclaimer, the term of this patent is extended or adjusted under 35 U.S.C. 154(b) by 97 days.

(21) Appl. No.: 17/514,182

(22) Filed: Oct. 29, 2021

(65) Prior Publication Data

US 2022/0050824 A1 Feb. 17, 2022

Related U.S. Application Data

(63) Continuation-in-part of application No. 17/127,906, filed on Dec. 18, 2020, now Pat. No. 11,188,782.

(60) Provisional application No. 62/951,327, filed on Dec. 20, 2019.

(51) Int. Cl.
*G06F 16/23* (2019.01)
*G06F 16/903* (2019.01)
*G06N 20/00* (2019.01)

(52) U.S. Cl.
CPC .... *G06F 16/2365* (2019.01); *G06F 16/90344* (2019.01); *G06N 20/00* (2019.01)

(58) Field of Classification Search
CPC ............. G06K 9/6212; G06K 9/00469; G06K 9/6215; G06K 9/6264; G06N 3/04; G06Q 10/083
See application file for complete search history.

(56) References Cited

U.S. PATENT DOCUMENTS

| | | | |
|---|---|---|---|
| 8,341,520 B2 | 12/2012 | Iakobashvili et al. | |
| 9,977,633 B1 | 5/2018 | Khafizova | |
| 10,819,849 B1 * | 10/2020 | Bondareva | G10L 15/26 |
| 11,055,355 B1 * | 7/2021 | Monti | G06F 16/90332 |
| 2003/0218770 A1 | 11/2003 | Field | |
| 2004/0207867 A1 | 10/2004 | Stringham | |
| 2009/0055206 A1 * | 2/2009 | Orbke | G06Q 10/08 705/1.1 |
| 2009/0157733 A1 * | 6/2009 | Kim | G06F 16/217 707/999.102 |

(Continued)

FOREIGN PATENT DOCUMENTS

JP 2013206235 A 10/2013

OTHER PUBLICATIONS

Machine learning innovations in address matching: A practical comparison of word2vec and CRFs by Sam Comber and Daniel Arribas-Be (Year: 2019).*

(Continued)

*Primary Examiner* — Dhaval V Patel
(74) *Attorney, Agent, or Firm* — Jeffrey Schox; Diana Lin

(57) ABSTRACT

The method for address verification preferably includes: receiving an unverified address; parsing the unverified address into address elements; determining a candidate address set based on the address elements; determining an address comparison set from the verified address database; selecting an intended address from the address comparison set; optionally facilitating use of the intended address; and optionally determining and providing a call to action based on the intended address.

20 Claims, 7 Drawing Sheets

(56) References Cited

U.S. PATENT DOCUMENTS

| | | |
|---|---|---|
| 2009/0187733 A1 | 7/2009 | El-Ghazawi |
| 2013/0054491 A1 | 2/2013 | Chatow et al. |
| 2014/0079428 A1 | 3/2014 | Park et al. |
| 2016/0300250 A1 | 10/2016 | Rai et al. |
| 2016/0352976 A1 | 12/2016 | Kuroiwa |
| 2020/0278987 A1* | 9/2020 | Liu .................. G06F 16/90324 |

OTHER PUBLICATIONS

Chen, Anthony "How We Solve Problems at Lob—Intelligent Mail Through Routing" Lob Blog,https://www.lob.com/blog/how-we-solve-problems-at-lob-intelligent-mail-through-routing, Nov. 9, 2020, 15 pages.

Sam Comber, • Machine learning innovations in address matching: A practical comparison of word2vec and CRFs (hereafter Comber). (Year: 2019).

Smart Order Routing, "How Do We Route Print Jobs?", https://www.cloudprinter.com/order-routing, Nov. 9, 2020, 9 pages.

* cited by examiner

METHOD AND SYSTEM FOR ADDRESS VERIFICATION

CROSS-REFERENCE TO RELATED APPLICATIONS

This application is a continuation-in-part of US application Ser. No. 17/127,906 filed 18 Dec. 2020, which claims the benefit of U.S. Provisional Application No. 62/951,327 filed 20 Dec. 2019, which is incorporated in its entirety by this reference.

TECHNICAL FIELD

This invention relates generally to the address verification field, and more specifically to a new and useful method for address verification.

BACKGROUND

Address verification can be useful, for example, for verifying addresses and correcting incorrectly entered addresses. Current tools are inadequate for automatically correcting addresses without human verification. Thus, there is a need in the address verification field to create a new and useful system and method for address verification. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
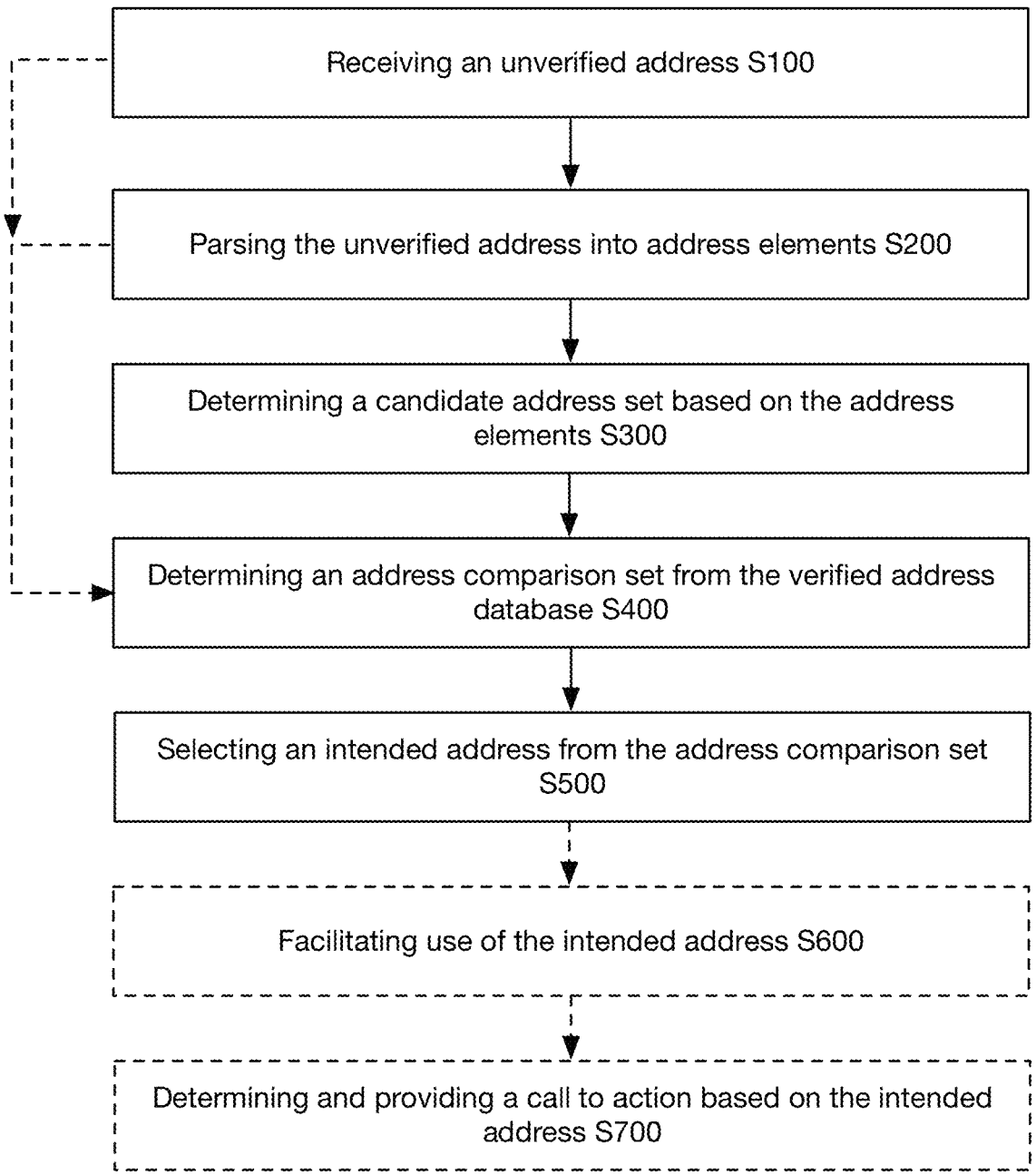
FIG. 1 is a schematic representation of the method.
Figure 2:
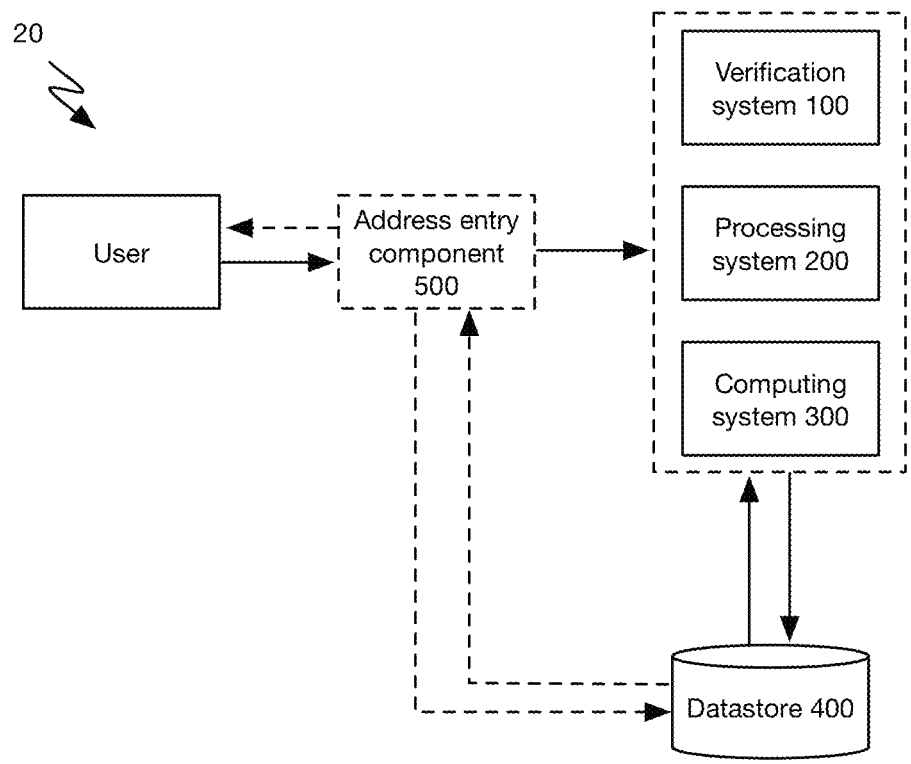
FIG. 2 is a schematic representation of the system.

As shown in FIG. 1, the method for address verification preferably includes: receiving an unverified address S100; parsing the unverified address into address elements S200; determining a candidate address set based on the address elements S300; determining an address comparison set from the verified address database S400; selecting an intended address from the address comparison set S500; optionally facilitating use of the intended address Shoo; and optionally determining and providing a call to action based on the intended address S700; and/or any other suitable elements.

2. EXAMPLES

Figure 5:
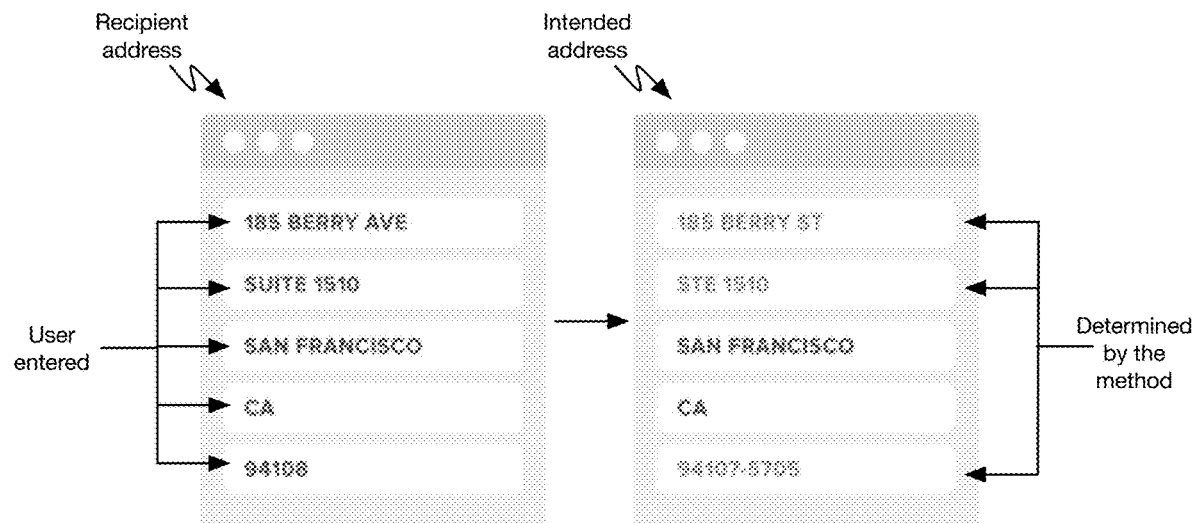
FIG. 5 depicts a specific example of the input and the output of the method.

In a first example of method and/or system use, a sender can incorrectly enter an unverified address for a recipient (e.g., as depicted in FIG. 5), wherein the system can automatically determine the correct address (e.g. without additional sender approval or verification). After a period of time (e.g., a day, 2 days, 3 days, a week, 2 weeks, etc.) from when the sender incorrectly enters the address, the recipient can receive a mail advertisement at an intended address (e.g., as depicted in FIG. 5), without the sender having to correct the inaccurately entered address or verify a suggested (intended) address.

In a second example, the method for verifying an unverified address associated with a recipient for an asset can include: receiving the unverified address from a sender; generating a candidate address set based on the unverified address; determining an address comparison set from an address database based on the candidate address set; and selecting an intended address from the address comparison set, wherein the intended address is selected based on a similarity score between each address of the address comparison set and the unverified address, and wherein the asset is sent to the intended address. Generating a candidate address set based on the unverified address, can include: parsing the unverified address into address elements, wherein each address element is associated with an element label; and mutating the address elements to generate the candidate address set.

In a third example, the system for verifying an unverified address associated with a recipient for an asset, includes an address entry component. The address entry component can be configured to: ingest the unverified address in a single action from a sender (e.g., selection of a "verify" icon after unverified address entry); and in response to the single action, send the unverified address to the processing system and/or send an asset to an address. The processing system can be configured to: receive the unverified address; determine an address comparison set from an address database based on the candidate address set; and select an intended address from the address comparison set, wherein the intended address is selected based on a similarity score between each address of the address comparison set and the unverified address.

3. BENEFITS

Variations of the technology confer several benefits over conventional systems.

First, variants of the technology can determine an intended address based on a user-entered unverified address. User-entered addresses can include meaningless information (e.g., directional information, such as "to the left of", "to the right of", etc.; recipient information, typos, punctuation, etc.). Further, the user-entered address can be entered in a non-standard format (e.g., the state can be entered before the city, the apartment number can be entered before the primary number, etc.). The inventors have discovered a new and useful system and method that discards irrelevant information, standardizes the address, verifies the address, and optionally corrects the address. Variants of the system and method include: parsing the unverified address; generating a candidate address set (e.g., determined based on the parsed unverified address); and selecting an intended address based in part on verifying one or more of the candidate addresses and ranking the candidate addresses based on a distance measure to the unverified address.

Second, variants of the technology can identify whether an user-entered address is deliverable (e.g., whether an address is entered correctly), without human-in-the-loop verification. The technology can automatically correct the address without sender approval and/or verification, unlike conventional systems that require the sender to manually review a set of candidate addresses and select an intended address. For example, the method can automatically determine the intended address without presenting a suggested address (or set thereof) to the sender. In variants, the system and method can confer single-entry deliverable address determination, where a sender simply enters an unverified address and a real, verified address is automatically returned (e.g., without additional sender actions). However, other variants can include human verification of the intended address.

Third, variants of the technology enable more accurate and faster address verification than conventional systems. Increased accuracy can be accomplished by generating an address candidate set for consideration, independent of the verified address database (e.g., which enables more chances of success). Increased speed can be accomplished by: optionally limiting the database search by using a hierarchical search strategy (e.g., limiting the search to real addresses sharing the zip code(s) and/or city and state combination(s) of the address candidates); instead of matching based on the full-string (e.g., of an address element), optionally reducing the address candidates and verified addresses to mnemonic representations (e.g., phonetic encodings) and matching the shortened mnemonics; optionally calculating a first score between a verified address and the received address; and optionally, when comparing strings, calculating a first score for the address candidate-verified address pair (and/or substrings thereof) instead of doing a direct letter-to-letter comparison. In variants, computational power and time can be further reduced by limiting the first score calculation to the first N letters of the address candidate and verified address. Increased speed can additionally or alternatively be accomplished by using a cascade of the aforementioned methods to serially reduce the number of address candidates and/or verified addresses that are under consideration.

However, variants of the technology can confer any other suitable benefits and/or advantages.

4. SYSTEM

The method is preferably performed using system 20, including: one or more verification systems 100; one or more processing systems 200; one or more computing systems 300; one or more datastores 400; one or more address entry components 500; and/or any other suitable components. The system can be used with one or more addresses and/or any other suitable elements.

The verification system 100 preferably functions to perform the method. The verification system can process a received address (unverified address). When the system receives a batch of unverified addresses, the batch can be processed by the verification system in series or in parallel. The verification system can include one or more modules: a parse module, a mutation module, a selection module, and/or any other suitable module.

The parse module can function to determine address elements and associated element labels based on the unverified address. The parse module can include an explicit ruleset, a parsing algorithm (e.g., neural network, such as a DNN, CNN, RNN, etc.; decision tree; etc.), and/or any other suitable component for parsing the unverified address. In a specific example, the parse module can be a named-entity recognition (NER) parser (e.g., using GATE, OpenNLP, SpaCY, etc.). However, the parse module can be otherwise configured.

The mutation module can function to determine one or more candidate addresses based on the address elements and/or element labels. The mutation module can include: re-organizing address elements, combining address elements, splitting address elements, replacing address elements (e.g., words) with new address elements (e.g., based on a similarity score, phonetic encoding, randomly selected values, values generated or selected by a trained neural network, etc.), and/or any other mutation. However, the mutation module can be otherwise configured.

The selection module can function to select an intended address from the address comparison set, select a new address element from a set of new candidate address elements, and/or perform any other selection. Selection can be performed based on a similarity score, randomly, and/or otherwise performed. The similarity score can be a distance metric between a candidate address and the verified address, between an address element and a candidate address element, and/or between any other elements. The distance metric can be Levenshtein distance, Jaro distance, Jaccard's distance, and/or any other suitable distance metric. The distance metric can be applied per address element, per address, and/or otherwise applied to an address. The distance metric can be applied to a predetermined number of characters of the address or address element (e.g., first N characters, wherein N can be 10, 15, 20, etc.), to the entire address, and/or otherwise applied to the address. However, the selection module can be otherwise configured.

However, the verification system can include any other suitable components.

The processing system 200 can function to execute one or more modules of the system. The processing system can be localized or distributed. The processing system can include one or more processors (e.g., PCB, CPU, GPU, etc.). The processing system can include one or more pieces of computer memory configured to store instructions, that when executed, perform the method(s) described herein (e.g., non-volatile memory, such as RAM or Flash; volatile memory; etc.). However, the processing system can be otherwise configured. The processing system can be: remote, local, distributed, centralized, or otherwise configured.

The datastore 400 functions to store the information from mail partners (e.g., USPS, FedEx, etc.), such as verified addresses; information determined by the method (e.g., addresses, address elements, element labels, etc.); one or more candidate address element sets; information retrieved from the mail partner (e.g., using an API call, downloaded, etc.); and/or any other suitable information. The datastore can be a NoSQL database, a relational database (RDS), and/or any other suitable database. The datastore can have a configuration, such as distributed and/or centralized, but can additionally or alternatively have any other suitable configuration. The datastore can store an address determined by the system and method, a verified address database, mnemonic codes (e.g., phonetic encodings, such as BR, BE, etc.), and/or any other suitable information.

The addresses determined by the system and method (e.g., unverified address, candidate address set, intended address, etc.) can be accessible in the datastore based on a unique mail identifier. Each entry can include an unverified address, an intended address, a confidence score, and/or any other suitable information.

The verified address database preferably functions as a source of truth for the real, verified, deliverable mail addresses. The verified address database preferably includes mail partner address data and printed mail address data (e.g., based on a delivered event, out for delivery event, and/or any other suitable event associated with a verified address), but can additionally or alternatively include any other suitable data.

The verified address database can be updated based on receiving notifications (e.g., scan events) from a mail partner. The notifications can additionally or alternatively be processed (e.g., notifications can be processed, such as to determine return to sender events, which can be used to selectively filter out the address from the mail address database when the address is associated with such an event). However, the database can be updated using any other suitable process.

The datastore optionally stores mnemonic codes (e.g., phonetic encodings, such as BR, BE, etc.) for each verified address (e.g., for each address element, for the entire address, etc.). However, the datastore can additionally or alternatively store any other suitable information.

The datastore optionally stores a candidate address element set associated with a particular address element. The candidate address element set can be determined from the verified address database based on the particular address element. The particular address element can be a zip code, zip code+4 (9-digit zip code), city, state, and/or any other address element. The candidate address element set associated with the particular address element can be all street names (or a subset thereof) associated with the particular address element, all primary numbers (or a subset thereof) associated with the particular address element, and/or any other suitable address element.

The address entry component 500 can function to ingest an unverified address, a batch of unverified addresses, and/or any other suitable user input. The address entry component can be a user interface, upload interface, and/or any other suitable interface. The user interface can be: freeform text, fields for each address element, and/or any other suitable format. The address entry component can ingest an unverified address in a single action. The single action can be after entry of the address, or be the entry of the unverified address. The single action can be a confirmation mouse event (e.g., mouse click), button event (e.g., enter key press, return key press, etc.), an upload event, and/or any other suitable event. The address entry component can send the ingested address to the verification system and/or to any other component of the system.

The one or more addresses can include one or more unverified addresses (e.g., address entered by a user, generated by a system, etc.), a candidate addresses set (e.g., based on the unverified address, such as by parsing the unverified address into unverified address elements and determining new address elements from the unverified address elements), an address comparison set (e.g., deliverable addresses based on comparison of the candidate addresses with the verified address database), a plurality of mail addresses (e.g., stored in the verified address database), and an intended address (e.g., selected based on the unverified address), but can additionally or alternatively include any other suitable address.

Each address is preferably represented as a JSON object, but can additionally or alternatively be represented as a series of address elements, and/or represented with any other suitable object or data representation.

The unverified address functions as the user input to the system. The unverified address is preferably received from a sender, but can additionally or alternatively be generated by the system, by a third party, and/or otherwise determined. The unverified address can be received as: a string of alphanumeric characters (e.g., in a single field), as a set of values entered into multiple address entry fields (e.g., address line 1, address line 2, city, state, zip code, etc.), and/or otherwise received. The unverified address can be human generated, machine generated, machine extracted (e.g., from HTML, from a document, from a webpage, etc.), and/or otherwise determined. The unverified address preferably includes one or more address elements. Address elements can be received as part of the unverified address and/or determined from the unverified address (e.g., by the system and method).

Figure 4A:
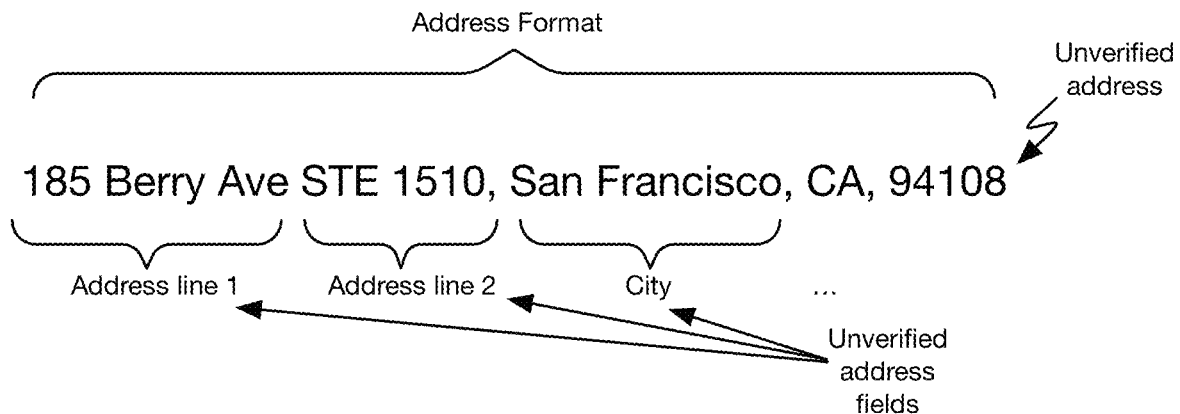
FIG. 4A-D depicts a specific example of the method
Figure 4B:
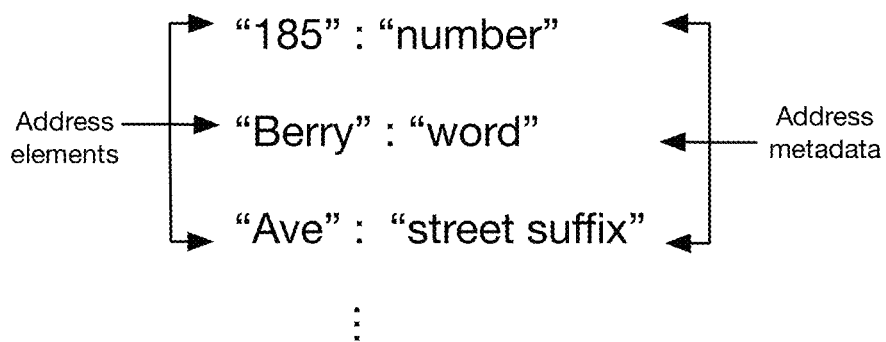
Figure 4C:
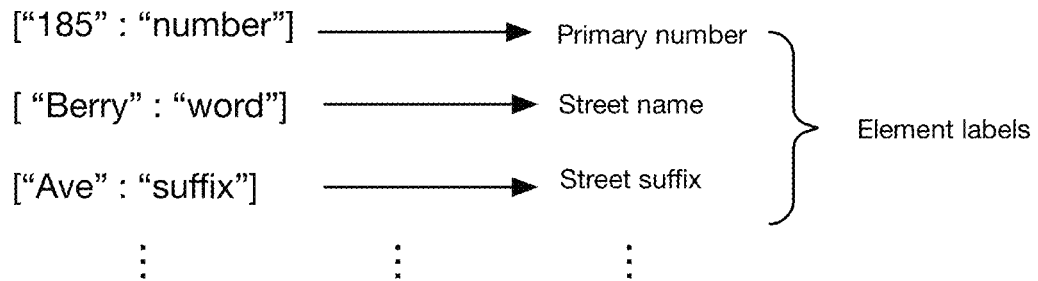

The unverified address (e.g., shown in FIG. 4A) can include address elements (e.g., primary number, street pre-direction, street name, suffix, street post-direction, secondary designator, secondary number, PMB designator, PMB number, city, state, zip code, etc.). Each address element can be compiled into an address format. Each address element can be characterized as and/or associated with a character type (e.g., during embedding creation for the word, separately from embedding creation, etc.), as shown in FIG. 4B, which can characterize the address element. Examples of character types can include: a number, uppercase or lowercase letter, a suffix, and/or any other classification (e.g., such as by using a classification algorithm, a ruleset, etc.). The character type can characterize the address element based on the address element directly, based on a ruleset (e.g., regular expressions that analyze characters in a string), based on constraints, and/or the character type can be otherwise determined. Each address element can be associated with an element label, as shown in FIG. 4C, which can characterize the address element type. The element label can be determined in S200, based on the address entry component, and/or otherwise determined. Multiple address elements can be combined into a field (e.g., address line 1, address line 2, primary line 1, primary line 2, etc.).

In a first example, a U.S. address can include the following fields: a recipient (e.g., intended recipient, such as the name of a person or company); an address line 1, an optional address line 2, city, state (e.g., a 2 letter state short-name code, a full string, etc.); a zip code; a country; and/or any other suitable field.

In a second example, an international address can include the following fields: a recipient (e.g., intended recipient, such as the name of a person or company); primary line (e.g., street address); an optional secondary line (e.g., secondary address, information such as additional primary line information, etc.); a last line (e.g., combination of the following applicable components: city; state; zip code; etc.), country; and/or any other suitable field.

The unverified address is preferably associated with additional information. The additional information can include: an identifier, which can be unique (e.g., temporally, globally, etc.); a description; a deliverability status (e.g., deliverable; deliverable but missing one or more address element values, such as the street type or the city, but is likely deliverable; undeliverable); and/or any other suitable information.

In variants, deliverability status (e.g., of the unverified address, the intended address) can be determined based on a machine learning model, based on the mail address dataset, based on scan information from a mail partner, and/or otherwise determined. The deliverability status can be determined based on the proximity between the unverified address and the intended address, the number of mail address candidates remaining after a S500 or a subprocess thereof, and/or based on any other suitable data. However, the unverified address can additionally or alternatively be otherwise defined.

Figure 4D:
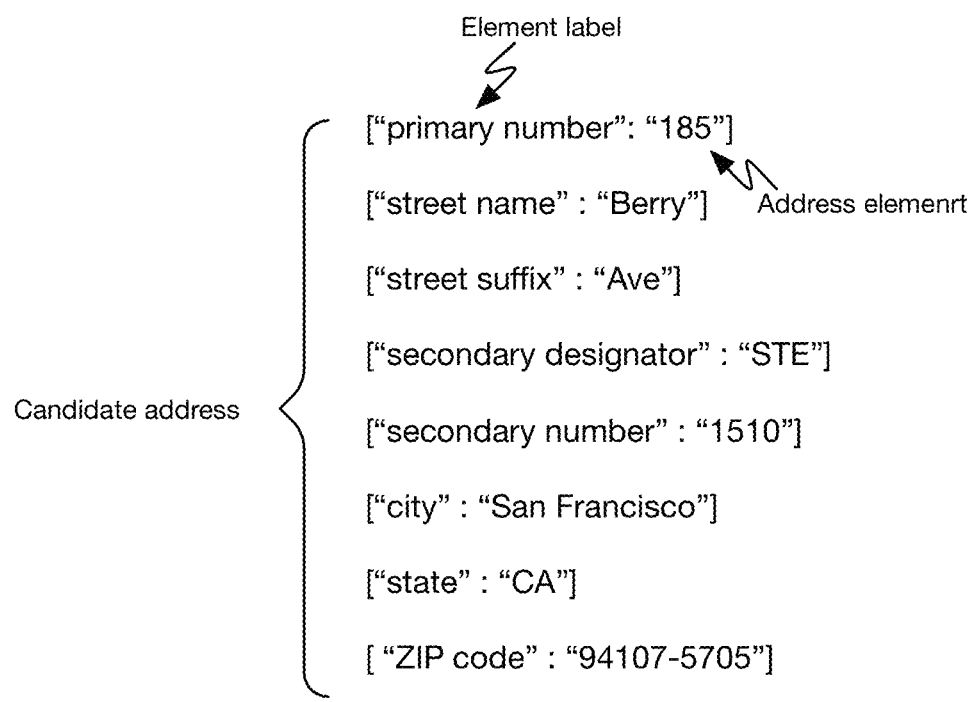

The candidate address set can function as a set of machine-manipulatable representations of the unverified address. A candidate address can include address elements, which can be custom address elements (e.g., from the unverified address), standard address elements (e.g., consistent with the address elements stored by the mail address database), and/or any other suitable address element. The address elements can include: a primary number; street pre-direction; street name; street suffix; street post-direction; secondary address designator (secondary address identifier); secondary number (secondary address); PMB designator; PMB number; corner address; highway; rural route addresses; and/or any other suitable address element. A specific example of a candidate address is depicted in FIG. 4D.

A candidate address can be separated into address elements, or otherwise segmented. A candidate address can be associated with a candidate address template, where the address elements can additionally or alternatively be arranged within the candidate address according to a predetermined order. The predetermined order preferably adheres to an address format, but can additionally or alternatively adhere to any other suitable format. Additionally or alternatively, the address elements can be unordered.

A candidate address is preferably standardized (e.g., suite can be abbreviated to STE., street can be abbreviated to st., zip code can be converted to the 9 digit zip code, etc.).

A candidate address can function to provide alternative addresses to the unverified address, which can account for human errors in unverified address entry (e.g., spelling errors, field entry errors, accidental concatenation or splitting, homophones, etc.). Candidate addresses can be generated by the mutation module, received from a user, or otherwise determined.

The candidate address set is preferably compared to the verified address database in S400. However, the candidate address set can additionally or alternatively be otherwise defined.

The intended address can function as the address to be used for subsequent address processes, and is treated as the address that the sender intended to enter (when entering the unverified address). The intended address is preferably determined in S500, but can additionally or alternatively be determined by any other suitable element. The intended address is preferably a real, deliverable address (e.g., appears within the verified address database), but can additionally or alternatively be any other suitable address. The intended address is preferably selected from the address comparison set, but can additionally or alternatively be selected from the candidate address set, and/or any other suitable address set. The intended address can optionally be associated with a confidence score (e.g., determined based on historical attempts to interact with, such as deliver to, said address; otherwise determined; etc.). The intended address can additionally or alternatively be otherwise defined.

However, the one or more addresses can additionally or alternatively include any other suitable addresses and/or address characteristics.

However, the system 20 can additionally or alternatively include any other suitable elements.

5. METHOD

The method for address verification preferably includes: receiving an unverified address S100; parsing the unverified address into address elements S200; determining a candidate address set based on the address elements S300; determining an address comparison set from the verified address database S400; selecting an intended address from the address comparison set S500; optionally facilitating use of the intended address S600; and optionally determining and providing a call to action based on the intended address S700; and/or any other suitable elements.

The method is preferably performed by the system disclosed above, but can be otherwise performed.

The method can be used for: asset delivery (e.g., automated mail delivery), address verification, navigation (e.g., to verify that the address is real before navigating to the address), and/or in any other suitable use case. The method can be applied to unverified addresses individually (e.g., one at a time); in bulk; or in any other suitable order or batching. The method can verify (e.g., classify) the unverified address in real- or near-real time (e.g., within a second, within 1-5 milliseconds, within 10 milliseconds, etc.), or verify the unverified address asynchronously with unverified address entry and/or single action performance.

5.1 Receiving an unverified address S100.

Receiving an unverified address S100 can function to receive an address to verify and/or act upon. The unverified address is preferably received at the address entry component (e.g., user entered, uploaded, etc.), but can additionally or alternatively be received at an address application programming interface (API), and/or any other suitable interface. The unverified address can be received: as values within individual address element fields (e.g., entry fields, columns, etc.), as a string, or in any other suitable format. The unverified address can be extracted from an address field of mail batch, and/or otherwise determined. The unverified address can be received individually, as a batch (e.g., CSV, pulled from an external database, etc.), from an API, pulled from a sender's database, and/or be otherwise received. The unverified address can be transferred to S200, S400, S500, and/or be otherwise used by the method. The unverified address can additionally be stored in the datastore or not stored.

Receiving the unverified address can include pre-processing the unverified address.

In a first variant, pre-processing the unverified address can include removing punctuation (e.g., symbols) from the unverified address.

In a second variant, pre-processing the unverified address can include standardizing address elements of the unverified address (e.g., abbreviating a suffix, such as "road" to "Rd"; abbreviating a state name to a state name abbreviation, such as "Alabama" to "AL"; etc.).

In a third variant, pre-processing the unverified address can include concatenating the fields of the unverified address into a string (e.g., when the address is received as primary line 1, secondary line 1, city, state, zip code, etc.).

However, pre-processing the unverified address can include standardizing the unverified address (e.g., making all letters the same case, such as uppercase or lowercase; correcting typos; separating words; etc.); and/or otherwise preprocessing the unverified address.

However, the unverified address can be otherwise received.

5.2 Parsing the unverified address into one or more address elements S200.

Parsing the unverified address into one or more address elements S200 can function to split the unverified address into a set of address elements, assign an element label to each address element, and/or provide any other functionality. The address elements can be determined by the parse module, and/or any other suitable component of the system.

S200 is preferably performed based on the unverified address, information stored in the datastore (e.g., other addresses), and/or any other suitable information.

In a first variant, parsing the unverified address can be performed using an explicit ruleset. The unverified address can be parsed by tokenizing the unverified address (e.g., by spaces, by punctuation, using regular expressions, etc.) to determine individual tokens (e.g., individual words or numbers). One or more of the tokens can then be grouped to form address elements e.g., a street name address element can include the tokens "123," "Martin," "Luther," and "King"). Additionally or alternatively, parsing the unverified address can include: pattern matching the unverified address with a standard address format to determine address elements and/or any other suitable process. Each address element can be assigned an element label (e.g., after the unverified address is parsed) using the explicit ruleset (e.g., single element label per address; ordering of address elements, such as street suffix comes after street name; etc.). The element label can be generated from: the address element, the address element entry context (e.g., the address entry component field that the unverified address was entered into, the address element order, etc.), and/or any other suitable data. The element label can represent: the actual or estimated address element type (e.g., primary number, street name, street suffix, etc.), the token type (e.g., string, float, integer, etc.), an address element probability, and/or any other suitable data. In a first example, the address element can be "185" and the element label can be "primary number." In a second example, the address element can be "st." and the element label can be "street suffix".

The element label can additionally or alternatively be updated by the system and method using the explicit ruleset. For example, an address can include 3 address elements in position 1, 2, and 3 respectively: the address element "st." can originally be associated with element label "street suffix," the address element "Francis" can be associated with "street name" and "st." can be associated with street suffix (ordered list of address elements). A set of constraints, including a constraint that specifies that there can be a single street suffix per address, can be applied to the element labels to update the element label for "st." in position 1 to "street name" and/or any other suitable element label other than "street suffix." However, assigning an element label to each address element can additionally or alternatively include any other suitable process.

In a second variant, parsing the unverified address can be performed using a parsing algorithm (e.g., neural network, decision tree, etc.). The parsing algorithm can include one or more neural networks (e.g., CNN, DNN, RNN, etc.). The neural network (e.g., machine learning model) preferably ingests the unverified address and determines one or more address elements and associated element labels.

In a first embodiment, a single neural network can determine all address elements and associated element labels. In this embodiment, the neural network can optionally include a multi-objective function that both optimizes for the address elements and element labels, and optimizes for estimating the number of address elements in the address (e.g., using multiple output heads for the neural network). Additionally or alternatively, the number of address elements can be estimated by a separate classifier (e.g., neural network, logistic regression, support vector machine, etc.) or not estimated. A comparison score between the estimated number of address elements and the ground truth number of address elements can be used to re-train the neural network (e.g., incorporated into the neural network's loss function).

In a second embodiment, multiple neural networks can each determine a different address element and element label based on the unverified address. For example, the system can include a different neural network for each address element type (e.g., a recipient network, a primary number network, a street name network, etc.). In this example, the strings or values with the highest score (e.g., probability) output by a network can be labelled with the address element type associated with the respective network.

The one or more neural networks can be trained on examples of addresses and corresponding element labels. The example addresses used for training can be mutated to create new example addresses, such as by replacing existing address elements with new address elements (e.g., replacing an existing state with a new state, replacing an existing city with a new city, etc.).

The one or more neural networks can be trained using active learning such that when the confidence associated with an output (e.g., predicted address elements and element labels) is below a predetermined threshold during inference (e.g., below 0.5, 0.4, 0.3, 0.2, 0.1, etc.), the inference address can be labelled (e.g., manually, automatically by a third party, automatically by the system, etc.) and used to re-train the neural network.

In a third variant, the address elements can be determined based on which input field the address values were entered into (e.g., wherein the system can rely on the user to correctly classify the address elements).

After determining the address elements and the element labels, the address elements can be standardized (e.g., street suffixes can be abbreviated, such as "street" can be abbreviated to "st."; expanded to the full word, such as "st." can be expanded to "street"; states can be abbreviated or expanded, etc.).

The parsed address elements can be used in any manner. In one example, the address element values can be used to verify the values for other address elements. In a specific example, the address element associated with postal code and/or zip code can be used to determine the 9-digit zip code, wherein the 9-digit zip code can replace the address element. In a second specific example, the city and state address elements can be used to verify the zip code and/or 9-digit zip code (e.g., using a lookup table). However, the address elements can be otherwise used.

However, the address elements can be otherwise determined.

5.3 Determining a candidate address set based on the address elements S300.

Determining a candidate address set based on the address elements S300 can function to generate new addresses based on the unverified address. The candidate addresses can subsequently be used to generate the address comparison set, and can optionally be used as intended address candidates. The candidate addresses within the candidate address set preferably do not have to be deliverable and/or verified addresses, but can be deliverable and/or verified addresses. The candidate address set can be determined by the mutation module, and/or any other suitable component of the system. The candidate address set is preferably determined after S200, but can additionally or alternatively be determined contemporaneously with S200, after S100, and/or at any other suitable time. The candidate address set is preferably generated based on the address elements, but can additionally or alternatively be generated based on the unverified address, and/or any other suitable information.

In a first variant, determining a candidate address based on the address elements can include matching the address elements to the standardized address elements specified by an address candidate template. A specific example is depicted in FIG. 4C. Matching the address elements is preferably performed in an order, such as preferably bottom to top (i.e. right to left, end to front, etc.), but can additionally or alternatively be performed top to bottom (i.e., left to right), and/or performed in any other suitable order.

In a second variant, determining a candidate address can include matching the address elements to a generic address using regular expressions and constraints.

In a third variant, determining a candidate address can include mutating the address elements. Mutating the address elements can be performed based on a set of mutation constraints. Mutation constraints can include types of mutations, metadata constraints, and/or any other suitable constraints. Examples of mutations include: combining one or more address elements, splitting an address element into multiple address elements (e.g., split the string), re-ordering the address elements, expanding the address element (e.g., insert characters, etc.), and/or any other suitable mutation. Examples of metadata constraints applied to the address elements can include updating the assigned element label (e.g., as described above). For example, the address elements can include the list: {"st.": "street suffix"}, {"Francis": "name"}, {"st.": "street suffix"}. The constraint that only one street suffix can exist per address can be applied to the above list (e.g., the right most suffix can be preserved). The mutation can include joining "st." with "Francis" and additionally updating the element label (e.g., {"st. Francis": "street name"}, {"st.": suffix}, such as Saint Francis Street whereas Saint is abbreviated st. and street is abbreviated st.).

In a second variation, mutating the address elements can include a recursive mutation process. The recursive mutation process can include: generating a first set of mutated addresses by passing the address elements through a set of mutation constraints; generating a second set of mutated addresses by passing each of the addresses of the first set of mutated address through the set of mutation constraints; and continue generating mutated address until no further mutations are possible; but can additionally or alternatively include any other suitable process.

In a third variation, determining a candidate address can include generating a new candidate address by replacing an existing address element of the unverified address with a new address element. The existing address element can be selected manually, automatically (e.g., randomly, using a selection ruleset, using a trained neural network, etc.), or otherwise selected. The existing address element can be a single address element (e.g., street name, primary number, etc.), a set of address elements, and/or any other suitable existing address element. The new address element can be: selected from a database, be phonetically related to the existing address element, be similar to the existing address element (e.g., using similarity measures), randomly selected, and/or otherwise determined. The database can include: all verified addresses; verified addresses (or address elements therefrom) sharing one or more address elements with the unverified address (e.g., all street names from the unverified address' zip code); and/or other information. The selection ruleset can rank the address elements based on a sender's likelihood of misspelling the address element (e.g., determined from historical data), and/or otherwise aid in selecting an address element.

In a first embodiment, determining a candidate address can include phonetically encoding an existing address element using a phonetic algorithm (e.g., single metaphone, dual metaphone, etc.) and selecting a new address element whose phonetic encoding is the same as the existing address element's encoding. In a first example, the existing address element with element label "street name" can be replaced by a new address element that shares the same phonetic encoding as the existing address element. The new address elements are preferably associated with deliverable addresses that share one or more different address elements with the unverified address elements (e.g., city; state; zip code; zip+4 code, such as the 9 digit zip code; etc.). The new address elements can be pulled from a candidate address element set associated with one or more of the other address elements (e.g., each zip code is associated with a pool of deliverable street names).

In a second embodiment, determining a candidate address can include determining a candidate address element set for the existing address element (e.g., retrieved from the datastore, generated by querying the verified address database with a particular address element from which to generate the candidate address element set, etc.). In a first example, the candidate address element set can include street names associated with a particular zip+4 (9-digit zip code). The particular zip+4 can be: the zip+4 of the unverified address, the zip+4 associated with the city and state of the unverified address, all zip+4s, zip+4s similar to the unverified address' zip+4 (e.g., with one or more values replaced or swapped), and/or any other suitable zip+4. In a second example, the candidate address element set can include street names associated with a particular city and/or state (e.g., of the unverified address).

The candidate address element set can optionally be filtered to reduce the size of the candidate address element set. In a first variation, filtering the set can include filtering elements that do not start and/or end with the same character as the existing address element. In a second variation, filtering the set can include filtering elements whose length are outside of a threshold length of the existing address element length (e.g., outside of 2 characters, outside of 3 characters, outside of 4 characters, outside of 5 characters, etc.). However, the set can be filtered using any combination of the above, and/or any other suitable filtering method. Filtering can be performed in any suitable order, or not performed.

In the second embodiment, a similarity score can be determined between each element of the candidate address element set (e.g., filtered or unfiltered) and the existing address element (e.g., using the selection module). For example, a score can be calculated between the street name of the unverified address and a candidate street name (from the candidate address element set). In a second example, a score can be calculated between the street addresses of the unverified address and a candidate address. The similarity score can be calculated based on each character of the address element, an N-gram of the address element (e.g., wherein N-grams, such as bi-grams or tri-grams, can be created for the unverified address and each candidate address in the set), a phonetic representation of each address element, or any other suitable representation of the address elements. The similarity score can be calculated using Jaro distance, Levenshtein distance, Jaccard coefficient, and/or any other suitable similarity measurement technique. Elements of the candidate address element set can be selected for inclusion in a candidate address based on the similarity scores. Selecting elements can include selecting one or more elements with optimal similarity scores (e.g., best, top 2, top 3, top 4, top 5, etc.). Selecting elements can include selecting elements whose similarity score is above or below a predetermined threshold (e.g., depending on the selection measurement technique). The predetermined threshold can be values above 0.5, 0.7, 0.8, 0.9, 0.95, and/or any other suitable value. The predetermined threshold can be values below 0.5, 0.4, 0.3, 0.2, 0.1, and/or any other suitable value. However, the elements can be otherwise selected.

One or more new candidate addresses (e.g., of the candidate address set) can be generated by replacing the existing address element with the one or more selected address elements, wherein each selected address element is used to generate a new candidate address.

However, the candidate address set can be determined using a combination of the above or otherwise determined.

5.4 Determining an address comparison set from the verified address database S400.

Determining an address comparison set from the verified address database S400 can function to determine deliverable addresses associated with one or more addresses of the candidate address set (e.g., from S300). The mail address comparison set is preferably determined from the verified address database, but can additionally or alternatively be determined from any other suitable database. The mail address comparison set is preferably determined based on each address of the candidate address set or portions thereof, but can additionally or alternatively be based on the unverified address (e.g., zip code, zip+4, city state, etc.), or otherwise determined.

S400 is preferably performed by the system, but can additionally or alternatively be performed by any other suitable system. S400 is preferably performed concurrently with S300, but can additionally or alternatively be performed after S300, and/or at any other suitable time. S400 is preferably performed before S500, but can additionally or alternatively be performed concurrently with S500, and/or at any other suitable time.

S400 preferably receives the candidate address set from S300, but can additionally or alternatively receive the unverified address from S100, and/or any other suitable address. The address candidate set determined in S400 is preferably transferred to S500, but can additionally or alternatively be stored in the datastore and/or be otherwise used.

In a first variant, the address comparison set can be all addresses stored in the verified address database.

In a second variant, the address comparison set can be a subset of the addresses stored in the verified address database. The subset of the addresses can be determined based on an address candidate's address elements, such as the 9-digit zip code, 5-digit zip code, city, state, and/or any other suitable address element, but can additionally or alternatively be based on any other suitable information. In one example, S400 can include extracting the zip codes for each candidate address (e.g., generated in S300). In a second example, S400 can include extracting the city and states from each candidate address, and identifying the corresponding zip code. However, the address elements can be otherwise identified.

In a first embodiment, the subset of the addresses can be determined using a hierarchical search, using one or more filters, using one or more constraints, and/or be otherwise determined. The hierarchical search can include determining if an address candidate's zip code (e.g., 5-digit zip code, 9-digit zip code) is within a set of zip codes associated with the address candidate's city and/or state. When the address candidate's zip code is within the set of zip codes associated with the address candidate's city and/or state, the mail addresses sharing the address candidate's zip code can be added to the mail address comparison set, such that the mail address comparison set includes addresses with the candidate address' zip code. When the candidate address' zip code is not within the set of zip codes, the set of mail address comparison set can be mail addresses associated with the address candidate's city and/or state, addresses associated with a finance number shared with the address candidate's zip code, and/or be any other suitable mail address from the mail address database.

Figure 6:
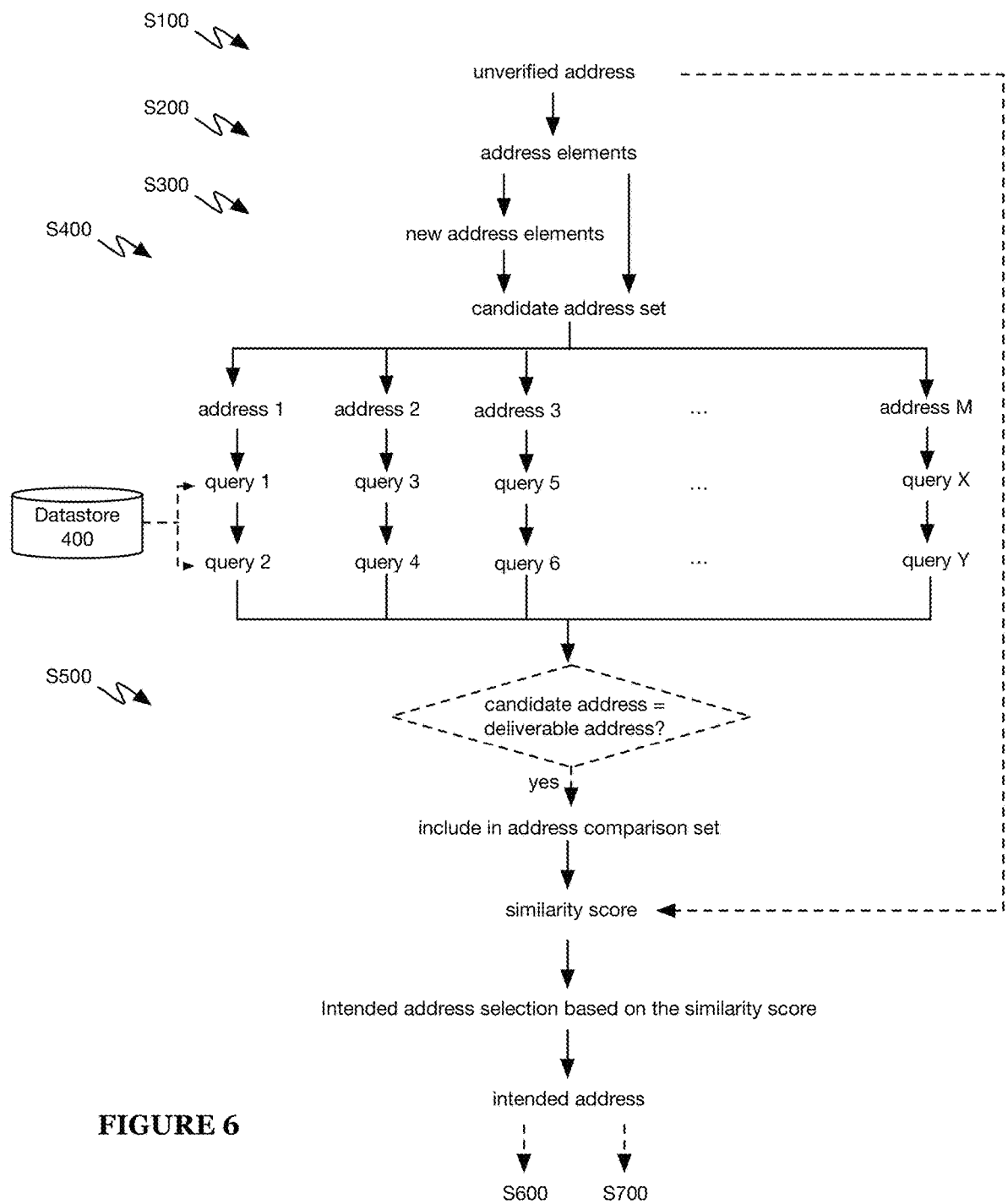
FIG. 6 depicts an embodiment of the method.

In a second embodiment, the address comparison set can be determined by querying the verified address database (e.g., as shown in FIG. 6).

In a first variant of the second embodiment, the address comparison set can be generated using two queries to the verified address database. A first query can include one or more address elements of a candidate address (e.g., 9-digit zip code, 5-digit zip code, city, state, street name, street suffix, etc.). The first query can determine a set of returned addresses, a block record (e.g., primary numbers for a zip code and/or street name pair), and/or any other suitable information, wherein the returned information can be treated as the address comparison set in S500. Additionally or alternatively, a second query can be performed on the result of the first query (e.g., returned addresses, block record, etc.) and can include a candidate address of the candidate address set. The second query can determine the associated primary number for each candidate address of the candidate address set and/or filter out candidate addresses that do not exist (e.g., are not associated with a primary number within the returned block record).

In a second example, the larger area of the candidate addresses (e.g., the cities, states, and/or zip codes) can be used to query a database of deliverable/verified addresses, wherein the query returns the address comparison set (e.g., block record; all addresses having the larger area value, etc.). The address elements of the unverified address can then be compared against results of the address comparison set in S500 to identify the intended address.

In a second variant of the second embodiment, the address comparison set can be generated using a single query on the verified address database. The single query can include a candidate address. The returned information can include an indicator of whether the candidate address matches an address in the verified address database (e.g., binary indicator, yes/no, etc.).

When a candidate address is not associated with addresses of the verified address database, the candidate address is considered undeliverable. The undeliverable candidate address is preferably not added to the address comparison set, removed from the address comparison set, and/or otherwise removed from consideration. When no candidate addresses remain in the candidate address set, the unverified address can be considered undeliverable, and a user can be notified of the unverified address' undeliverable status.

However, the address comparison set can be otherwise determined.

5.5 Selecting an intended address from the address comparison set S500.

Selecting an intended address from the address comparison set S500 can function to: automatically select an intended address from the mail address comparison set (e.g., the address the user intended to enter into the address entry component); search for the potential address, within the mail address comparison set, that match candidate addresses; and/or provide any other suitable functionality. S500 is preferably performed by the system, and more preferably by the selection module, but can additionally or alternatively be performed by any other suitable system. S500 is preferably performed after S400, but can additionally or alternatively be performed concurrently with S400, and/or at any other suitable time. S500 is preferably performed using the address comparison set determined in S400, but can additionally or alternatively be determined using the address comparison set, and/or any other suitable address.

S500 preferably includes selecting an intended address by comparing the unverified address with the address comparison set, but can additionally or alternatively select the intended address by comparing the candidate addresses with the address comparison set or otherwise selecting the intended address. The intended address can be selected using a similarity score (e.g., between the address' strings; between the address' phonemes; between the address' N-grams; between address elements; etc.), by process of elimination, using heuristics or rules, using a ranking (e.g., based on the score), using a partial or full string match of address element values, using a machine learning model (e.g., as discussed previously), or otherwise selected. A partial string match can include a subset of the characters of a string (e.g., the first 3, 4, 5, 6, or threshold number of characters, etc.).

The intended address can be selected from the address comparison set, the candidate address set, or from any other suitable address set.

In a first variant, S500 can include iteratively removing addresses from the address comparison set to arrive at the intended address and/or breaking a tie between two or more addresses having a similar score (e.g., determined using the fourth variant) using an explicit ruleset (e.g., removing addresses based on how the address was generated, such as removing addresses generated using the neural network, removing addresses generated by replacing one or more address elements, etc.).

In a second variant, S500 can include using a bloom filter to reduce the address comparison set to deliverable addresses based on data from a third-party datastore, data from the verified address database, and/or based on any other suitable data.

In a third variant, S500 can include reducing the addresses of the address comparison set to mnemonic representations (e.g., phonetic encodings), and including or retaining addresses of the address comparison set with mnemonic representations that satisfy a comparison criteria, but can additionally or alternatively include removing addresses that do not satisfy the comparison criteria from the address comparison set. The comparison criteria can include filtering addresses whose mnemonic representations do not match the mnemonic representations of the address elements of the unverified address. This process can be the same or different from the fifth variant of S500, discussed below.

Determining mnemonic representations for reducing the address comparison set can include using a predetermined algorithm to determine the mnemonic representations. The predetermined algorithm can be an encoding algorithm (e.g., double metaphone, metaphone 3, neural network, etc.).

Mnemonic representations can be determined for all addresses of the verified address database prior to performing the method, but can additionally or alternatively be determined at each iteration of the method, and/or determined at any other suitable time.

Mnemonic representations can be determined for all or a portion of the address elements of an address of the address comparison set. For example, if the street name of the address is Berry, the encoding could be BR, and BR can map to outputs that correspond to address elements (e.g., stored in the datastore) such as Berry, Barry, and/or any other suitable value. However, street names need not be the address element for comparison; other address elements, such as city, state, and/or any other suitable address element can be used for the comparison.

Mnemonic representations for an address of the address comparison set can be determined: asynchronously, when the mnemonic representations for the address candidates are determined, synchronously, and/or at any other suitable time.

After the encodings are determined, the mnemonic representations are preferably stored in the datastore, but can additionally or alternatively not be stored.

The mnemonic representations of an address of the address comparison set and the unverified address can be compared using: exact match, elastic search, a scoring method (e.g., first score, calculated based on the mnemonic representation), and/or any other suitable comparison.

Addresses of the address comparison set can be selected for retention within the address comparison set (or inclusion in a secondary comparison set) based on the comparison.

In a first example, S500 can include retaining addresses of the address comparison set that match the mnemonic representation of one or more of the address elements of the unverified address.

In a fourth variant, S500 can include ranking, scoring, or otherwise prioritizing the mail addresses within the mail address comparison set, and selecting the intended address based on the prioritization.

In a first embodiment of the fourth variant, S500 can include calculating a score (e.g., first score) for each address of the address candidate set compared to the unverified address and selecting an address—or removing an address from—the address comparison set based on how the respective first score satisfies a score criteria.

Instead of using a direct letter-to-letter comparison, the first score can be a distance metric, a similarity score, and/or any other suitable value. The distance metric can be Levenshtein distance, cosine distance, trigram, Jaro distance, Jaccard coefficient and/or any other suitable distance metric. The distance metric can be based on the entire address, a subset of the address elements (e.g., street name, street name and suffix, etc.), a subset of address (e.g., first N letters of each of the address candidate and mail address candidate, etc.), and/or the distance metric can be based on any other suitable information.

Selecting one or more intended addresses based on the score criteria can include: selecting addresses of the address comparison set with the shortest distance (and/or lowest score); selecting addresses with a score less than a threshold (e.g., 0.1, 0.2, 0.3, 0.4, 0.5, 1, 1.5, 2, etc.); selecting addresses with a score greater than a threshold (e.g., 0.5, 0.6, 0.7, 0.8, 0.9, 0.95, etc.); selecting addresses with the highest score, and/or any other suitable criteria.

In a second embodiment of the fourth variant, S500 can include scoring each intended address candidate (e.g., if there are more than one intended address candidates) with a score (e.g., second score). The intended address candidate can be part of an intended address set (e.g., a subset of the address comparison set) determined based on the first score determined in the first embodiment, or be otherwise defined. Scoring each intended address candidate can include calculating a second score between an intended address candidate (from the address comparison set) and the unverified address. The second score can be a distance metric, similarity score, and/or any other suitable score (e.g., calculated using the same or different methods as those discussed above). The distance metric can be Levenshtein distance, cosine distance, trigram, Jaro distance, Jaccard coefficient, and/or any other suitable distance metric. Comparing each intended address unverified address can be based on the distance metrics.

The second score can be calculated based on individual address elements, subset of address elements, applied to the address as a whole, a subset of the address (e.g., first N letters of each of the address candidate and mail address candidate), and/or be otherwise applied. In a specific example, the second score can be calculated based on the number of matching address elements (e.g., a primary number match; street name match; street suffix match; etc.), between an address of the address comparison set and the unverified address. In a second specific example, the second score can be calculated based on how close the address elements of an address of the address comparison set matches the respective address elements of the unverified address. However, the second score can be otherwise determined.

Selecting an address as the intended address can be based on a second score (e.g., closest to the unverified address, such as based on a lowest score, highest score, etc.). In a first variant, the second score can be used as a weight metric, such that each address of the address comparison set can be associated with a weight and the intended address can be selected from the address comparison set based on a die roll. In a second variant, the address closest, based on the second score, to the unverified address can be selected as the intended address.

In a fifth variant, S500 can include selecting the intended address using a trained machine learning model (e.g., neural network, logistic regression, support vector machine, etc.). For example, the ML model can receive a candidate address (and/or features thereof) from the candidate address set and a test address (and/or features thereof) from the address comparison set, and evaluate whether the candidate address and test addresses are the same. Alternatively, the ML model can receive the test address in a side channel, and determine a probability that the candidate address matches the test address, wherein the highest-probability candidate is selected or a candidate with a probability over a threshold can be selected as the intended address. However, the ML model can be otherwise used to determine whether the candidate and test addresses match. The trained machine learning model can be validated using leave-one-out cross-validation, k-fold cross-validation, nested cross-validation, and/or any other suitable validation technique. The features ingested by the ML model can be determined using a feature selection technique (e.g., recursive feature selection, SHAP values, Boruta, lasso regression, ridge regression, etc.). For example, the one or more selected features can be determined using recursive feature selection supplemented by Shapley Additive Explanations (SHAP) values, wherein features associated with higher SHAP values are assigned as one or more selected features.

In a sixth variant, S500 can include cascading one or more of the aforementioned methods to serially reduce the number of address candidates and/or mail address candidates that are under consideration.

Figure 3:
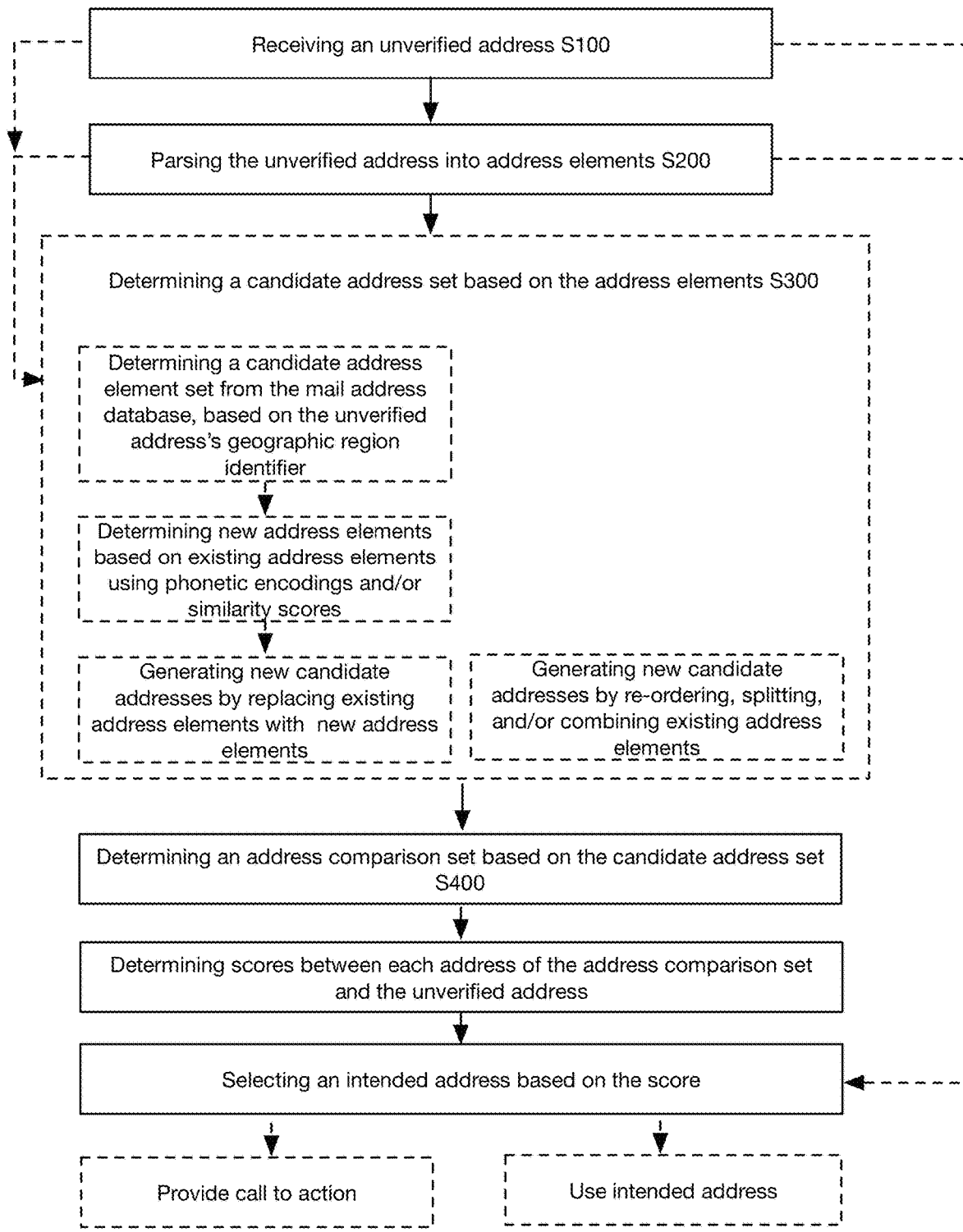
FIG. 3 is a schematic representation of a variant of the method.

For example (e.g., schematic representation shown in FIG. 3), S500 can include serially reducing the number of addresses in the address comparison set by applying in any suitable order: optionally the first variation, optionally the second variation, optionally the third variation, optionally the fourth variation, optionally the fifth variation, then, if more than one mail address candidate still remains within the address comparison set, applying other selection methods (e.g., random selection, selection based on confidence score, etc.). In another example, test and candidate address pairs are filtered out using a distance metric before further analysis by another method (e.g., the fifth variant).

However, the aforementioned variants can be combined and/or sub-combined in any suitable order or combination.

However, the intended address can be otherwise selected from the address comparison set.

5.6 Facilitating use of the intended address Shoo.

Facilitating use of the intended address Shoo can function to enable usage of the intended address. The intended address can be provided to the sender; provided to a sender endpoint (e.g., device, computer, etc.), and/or be otherwise provided. The intended address can be associated with mail for the recipient. The intended address can be presented to a secondary user (e.g., delivery service), different from the sender, such as to facilitate physically locating the structure and/or vehicle associated with the intended address. Shoo can include facilitating printing an asset by a print partner, wherein the asset is associated with the intended address. Shoo can include facilitating delivery of an asset to the intended address by a delivery service. However, use of the intended address can be otherwise facilitated.

5.7 Determining and providing a call to action S700.

Determining and providing a call to action S700 can function to determine information associated with the intended address. A call to action can include a deliverability confidence level, a response confidence level (e.g., based on deliverability, based on a secondary interaction with the recipient, such as a message, phone call, email, purchase, etc.), and/or any other suitable value. The call to action can be determined based on a calculation, based on a classifier, selected (e.g., from a predetermined set), and/or the call to action can be otherwise determined. The call to action can be provided to a user, provided to a sender endpoint, and/or otherwise provided. However, determining and providing a call to action can additionally or alternatively include any other suitable elements performed in any other suitable manner.

6. ILLUSTRATIVE EXAMPLES

In a specific example of the method and system, the unverified address can be received at an address entry component associated with the system. The system can determine address elements and associated element labels by parsing the unverified address based on spaces and labelling the address elements based on a template, and/or parsing the unverified address and labelling the address elements using a neural network. When the address elements are labelled using a template, the address elements can be ordered within the address template based on the unverified address element ordering, based on an address format (e.g., U.S. format, international format, etc.), and/or based on any other suitable format. The ordering can be based on a set of constraints (e.g., metadata constraints, address element constraints, rules, etc.). After the address elements are determined, a candidate address set can be determined by mutating the address elements (e.g., swapping the order of address elements, abbreviating the element values, combining element values, expanding element values, replacing existing address elements with new address elements, etc.). For example, combining element values can include combining "San" and "Francisco" to yield "San Francisco"). In another example, mutating address elements can include generating a first candidate with "Main" as a street name, a second candidate with "Mary" as a street name (e.g., selected from a candidate address element set associated with the zip code), and a third candidate with "Mani" as a street name (e.g., by reordering the address element letters). Mutating the address elements can include processing the address elements to account for misspellings by converting one or more address elements into associated phonetic encodings using a phonetic algorithm (e.g., single metaphone, dual metaphone, etc.). The phonetically-encoded address elements can then be compared to the phonetic encodings of address elements of verified addresses within the verified address database to determine new address elements. A candidate address can be generated by replacing the phonetically-encoded address element with the new address element and using the remaining address elements of the unverified address to generate the candidate address. The candidate address set can be used to generate the address comparison set (e.g., by querying the verified address database). An address comparison set can be determined from the addresses within the verified address database (e.g., provided by a delivery partner, by a government entity, etc.) by searching (e.g., using a hierarchical search) or filtering the verified address database using the zip code (e.g., 5-digit, 9-digit, etc.) of the address candidates and/or the city and states of the address candidates. Candidate addresses that are not found in the verified address database are considered undeliverable and are not included in the address comparison set. Each address in the address comparison set can be scored against the unverified address using a distance metric (e.g., Levenshtein distance, Jaro distance, Jaccard coefficient, etc.), wherein the address in the address comparison set with a score associated with an optimal score (e.g., lowest, highest, etc.) can be selected as the intended address. When multiple mail addresses still remain, a second score (e.g., a matching metric determined based on a number of matching address elements, string matches using regular expressions for a given address element or across a combination of address elements, or otherwise determined; a distance metric, such as a Levenshtein distance; etc.) can optionally then be calculated between the unverified address and each remaining address (e.g., each element, a combination of elements, and/or the entirety of each address. The address of the address comparison set that is most similar (e.g., most matching characters) to the unverified address (e.g., with the highest score, with the lowest score, shortest distance, etc.) can then be selected and used as the intended address. A deliverability confidence score (e.g., determined based on the proximity of the intended address to the unverified address, determined based on addresses in the verified address database, etc.) or other call to action can optionally be determined and presented to the sender. When multiple addresses are associated with the same score, an intended address can be selected based on how the address was generated (e.g., the address determined using a neural network can be removed from consideration; types of mutations to the address elements of the unverified address in S200, such as street name replacements, joining address elements, splitting address elements, etc.; etc.).

When an unverified address is determined to be undeliverable (e.g., no address candidates of the candidate address set remain, no addresses of the address comparison set remain, all scores are below a threshold, etc.), the unverified address entry can be associate with an undeliverable label, the sender can be notified using a push notification, an email, and/or otherwise notified, and/or other actions can be performed.

However, the intended address can be otherwise determined.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   receiving an unverified address;
   parsing the unverified address into a set of address elements using a parser;
   generating a candidate address set based on the set of address elements;
   determining an address comparison set from an address database based on the candidate address set using a hierarchical search, comprising:
   determining whether a zip code for a candidate address of the candidate address set is within a set of zip codes associated with a city for the candidate address; and
   adding a set of addresses associated with the zip code from the address database to the address comparison; and
   selecting an intended address based on a distance metric between an address from the address comparison set and the unverified address, wherein a physical asset is delivered to the intended address without human-in-the loop verification of the intended address.

2. The method of claim 1, wherein the unverified address is received as a string, wherein the string comprises a sequence of characters.

3. The method of claim 1, wherein receiving the unverified address comprises standardizing the unverified address.

4. The method of claim 3, wherein standardizing the unverified address comprises at least one of:
   adjusting a lowercase character into an uppercase character,
   removing a punctuation character,
   abbreviating a suffix, or
   abbreviating a state name to a state name abbreviation.

5. The method of claim 1, wherein generating the candidate address set based on the set of address elements comprises mutating the address elements within the set of address elements to generate the candidate address set.

6. The method of claim 5, wherein mutating the address elements comprises converting an existing address element of the unverified address into a phonetic encoding using a phonetic algorithm, and wherein a candidate address is generated by replacing the existing address element with a new address element associated with the phonetic encoding.

7. The method of claim 1, wherein the parser comprises a machine learning model.

8. The method of claim 1, wherein determining an address comparison set from an address database based on the candidate address set further comprises querying the address database based on an address element of a candidate address of the candidate address set.

9. The method of claim 8, wherein determining the address comparison set further comprises performing a query on the returned address set that provides a primary number, wherein the query comprises a candidate address within the candidate address set.

10. The method of claim 1, wherein selecting the intended address further comprises using a machine learning model comprising a support vector machine.

11. The method of claim 1, wherein the distance metric for the intended address is below a predetermined threshold.

12. The method of claim 1, wherein the distance metric comprises a Levenshtein distance.

13. The method of claim 1, further comprising facilitating printing and delivering a physical asset to the intended address.

14. A system for verifying an unverified address associated with a recipient for an asset, comprising:
   an address entry component, configured to:
      ingest the unverified address in a single action from a sender; and
      in response to the single action, send the unverified address to a processing system configured to:
         receive the unverified address;
         parse the unverified address into a set of address elements using a parser;
         generate a candidate address set based on the set of address elements;
         determine an address comparison set from an address database based on the candidate address set using a hierarchical search, comprising:
            determining whether a zip code for a candidate address of the candidate address set is within a set of zip codes associated with a city for the candidate address; and
            adding a set of addresses associated with the zip code from the address database to the address comparison set; and
         select an intended address based on a distance metric between an address from the address comparison set and the unverified address, wherein the intended address is selected automatically, without human input.

15. The system of claim 14, wherein the unverified address is a string, wherein the string comprises a sequence of characters.

16. The system of claim 14, wherein the parser is trained using active learning.

17. The system of claim 14, wherein the candidate address set is generated by mutating the address elements within the set of address elements to generate the candidate address set.

18. The system of claim 14, wherein the intended address is selected using a machine learning model.

19. The system of claim 14, wherein the distance metric comprises a string distance metric.

20. The system of claim 14, wherein the distance metric comprises a cosine distance.

* * * * *